United States Patent
Benteler et al.

[15] 3,668,918
[45] June 13, 1972

[54] METHOD FOR MANUFACTURING SHAFTS FOR VEHICLES

[72] Inventors: Helmut Benteler, Bielefeld; Franz-Josef Hartmann, Paderborn; Heinz Hefendehl, Schloss Neuhaus, all of Germany

[73] Assignee: Benteler-Werke Aktiengesellschaft, Kreis Paderborn, Germany

[22] Filed: Oct. 2, 1969

[21] Appl. No.: 863,149

[30] Foreign Application Priority Data

Oct. 23, 1968 Germany ...................P 18 04 673.6

[52] U.S. Cl. ...................................72/364, 72/367, 72/377
[51] Int. Cl. ..................................................B21k 1/10
[58] Field of Search ..........................72/367, 377, 364, 370

[56] References Cited

UNITED STATES PATENTS

| | | | |
|---|---|---|---|
| 2,256,065 | 9/1941 | Urschel et al. | 72/377 |
| 2,165,472 | 7/1939 | Friedman | 72/377 |

*Primary Examiner*—Lowell A. Larson
*Attorney*—Steinberg & Blake

[57] ABSTRACT

A shaft for automotive vehicles or the like, formed as a tube tapered at both ends, wherein the tube wall is peripherally thickened at one or more points extending beyond the reinforcement obtained by the tapering.

9 Claims, 9 Drawing Figures

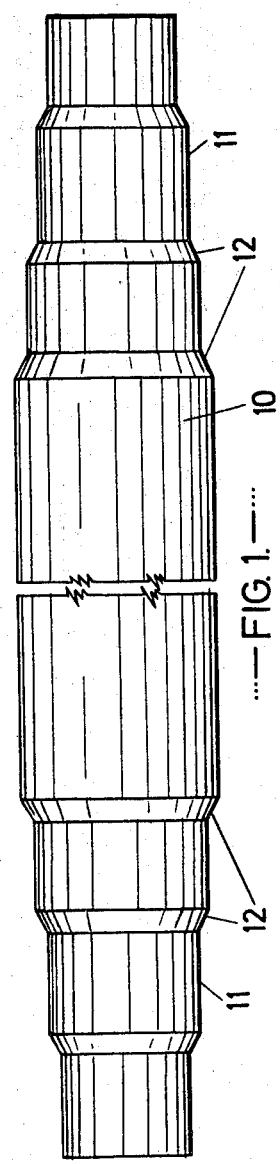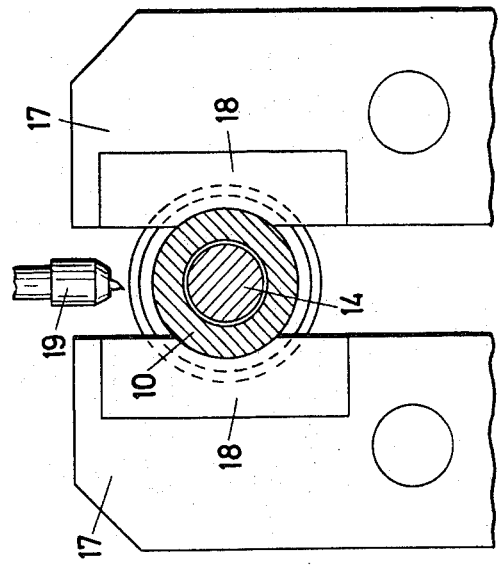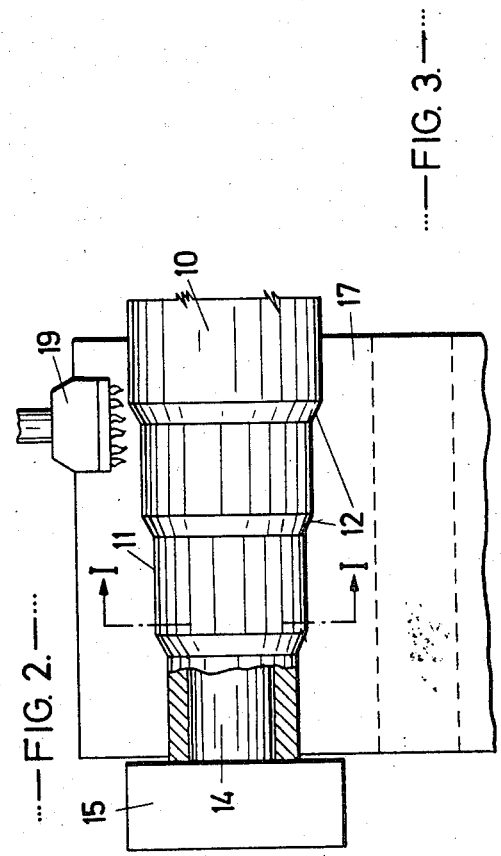

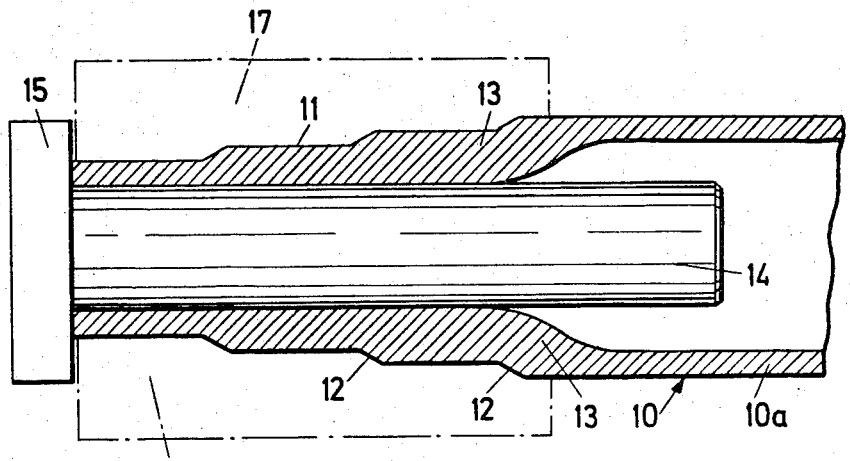
FIG. 4.
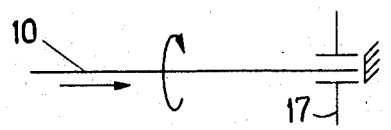
FIG. 5.
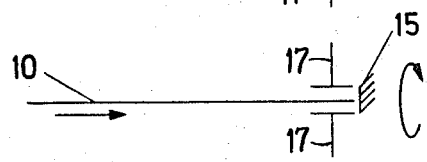
FIG. 6.
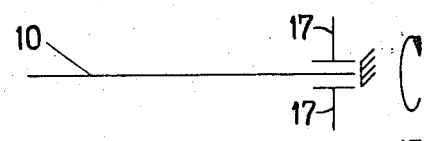
FIG. 7.
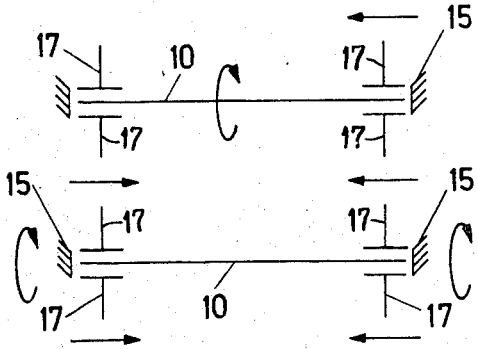
FIG. 8.
FIG. 9.

METHOD FOR MANUFACTURING SHAFTS FOR VEHICLES

The invention relates to a shaft for automotive vehicles or the like, comprising a steel tube tapered at both ends, and a method of producing such a shaft.

Shafts for automotive vehicles are known in various forms. If such a shaft is formed of a continuous steel tube, the latter is provided with conically tapering tube ends, which over the whole length and in the transition region from the central tube section to the tapers, have substantially the same tube wall thickness. This shaft has the disadvantage that in the load region of the shaft (the transition region between the central parallel tube section and the tapered ends), damage to the shaft by fracture may occur because of the relatively small tube wall cross-section; such shafts are only adapted to carry low loads.

Shafts for automotive vehicles are also known in which the tube sections subject to maximum stress are thickened. These shafts, besides being cumbersome and costly to produce, are composed of several individual parts which have to be joined together to form the shaft.

It is an object of the present invention to provide a shaft from one continuous steel tube, adapted to be subjected to considerable loads, and produced by way of a relatively simple method, and at low cost.

In accordance with the invention a shaft for automotive vehicles or the like formed as a tube tapered at both ends, is characterized by the feature that the tube wall is peripherally thickened internally at one or more points beyond the taper obtained.

In a preferred embodiment, the tube may be internally thickened in the transition region between its parallel section and the taper, the tube in the region of the taper having a uniform internal diameter over the whole length of the taper which is less than the internal diameter of the parallel section; the tube may have an external diameter which is step-tapered at both ends.

In accordance with a further feature of the invention a method of producing a shaft for automotive vehicles or the like is characterized by the feature that a tube has its external diameter tapered at both ends in one operation by means of a mandrel, and thickened by heating and axial compression in the transition region from the parallel tube section to the taper part. A preferred feature is that the tube during the tapering process is retained in an abutment by its end face, on the taper side.

A shaft in accordance with the invention is preferably formed of a tube tapered at both ends, preferably a steel tube, which at the tube cross-section subjected to maximum load (the transition region from the parallel tube section to the taper), is provided with an internal thickening, increasing the cross-sectional area of the tube on the inside. This thickening allows considerable loads such as torsion or bending to be withstood without the shaft, suffering damage or being destroyed, and imparts considerable stability and long life to the shaft; such a shaft may be produced with a variety of cross-sections.

A further advantage of the invention is the method of producing such a shaft, by means of which method the shaft may be formed from a tube, speedily and economically; the taper thickening being formed by axial compression on each shaft end in one operation, so that only two operations are required to produce a shaft from a convention tube.

An example of the invention is shown in the drawings, in which:

FIG. 1 is a side view of a shaft for automotive vehicles, made of a cylindrical tube tapered in stages at both ends, FIG. 2 is a side view of one tapered end region of the same shaft in the clamped state in a device for forging the taper, partly in section, FIG. 3 is a cross section through the same shaft and device, taken on the line I—I of Fig. 2, and FIG. 4 is a longitudinal section through the same shaft with stepped ends and central mandrel to fix the inside diameter in the taper region, FIGS. 5 to 9 are schematic views of tubes with tools in various tapering and compressing stages.

From the drawings, a shaft for automotive vehicles or the like consists of a seamless cylindrical steel tube 10, which is tapered at both ends. This tube 10 is provided at both ends with a taper 11 stepped as its outer diameter, the taper extending over a required length of the tube from a maximum at the outer (parallel) tube diameter via a plurality of smaller diameters to a minimum diameter at the end.

The transistions between the individual stages of taper from the maximum to the minimum outer diameter take place at externally encircling inclined or curved surfaces 12. The shaft in the region of the taper 11 has a constant internal diameter over the whole length of the taper, and less than the internal diameter of the parallel part of the original tube 10, so that the individual stages of the taper 11 have varying wall thicknesses which diminish towards the tube end.

The tube wall may be provided on the inside with a taper extending inwards beyond the extent of the outer taper so as to thicken the tube.

It is preferred to provide the transition region from tube section 10A (fig. 4) of the tube 10 to the taper region 11 with an encircling thickening 13 increasing the wall cross-section of the tube, so that in this transition region the shaft has high strength due to the increase in wall thickness.

Such a shaft is tapered at both ends during manufacture, the taper 11 of both tube ends being preferably produced by turning the tube 10, in one operation.

To produce the taper 11 the tube 10 is slipped over an axial mandrel 14 which is held in a device such as a chuck. This cylindrical mandrel 14 fixes the smallest inside diameter of the shaft in the taper region 11 and produces an internal diameter of uniform size over the entire length of the taper region.

The tube 10 to be tapered is fixedly retained at the end face of the tube by means of a shoulder 15 of the device. Two forging tools 17 provided with the shapes 18 of the desired taper forge the axially rotating tube 10 by hammering to the required taper 11.

In the gap between the two forging tools 17 there is a heating device such as a gas burner 19 which during rotational movement of the shaft in the machine, heats the taper end to a required temperature allowing the shaft to be axially compressed.

During the production of the taper 11, the tube 10 is simultaneously compressed by axial pressure against the shoulder 15, the compression being effective in the heated transition region of the cylindrical tube section 10a and taper 11; material flow occurs in the direction of the tube axis during forging the rotating tube wall; since the excess material cannot move towards the end of the tube, which is fixedly retained by the shoulder 15 — this compression forms a thickening 13 internally in the heated transition region which increases the cross-sectional area of the tube wall and increases the capacity of the tube 10 to stand up to loads in this region.

Various tube wall thicknesses or tapers can be produced since the position of the shoulder 15 is axially displaceable.

After forging the taper 11 the shaft is removed from the device and reversed to taper the other end. The mandrel 14 determines the inner diameter of the tube ends and maintains the taper 11 coaxial with the tube axis; this mandrel 14 also provides the shaft in the taper region with an internal diameter which is smaller than the internal diameter of the tube section 10a, and of uniform size over the whole length of the taper (see Fig. 4). Alternatively this mandrel 14 may itself taper slightly so as to increase its ease of withdrawal from the shaft.

The taper 11 and the compression of the tube 10 to form the inside thickening 13 is produced in one operation while the tube 10 rotates and is heated; the shaft with the tapers 11 at the ends and the thickenings 13 is a unitary structure.

The axle is quickly and economically produced from a cylindrical tube.

Figs. 5 to 9 of the drawing show sketches of various machining steps.

According to FIG. 5 at both ends the tube 10 is turned and the tools 17 (forging tools) are stationary; the end face of the tube 10 to be tapered is supported against the shoulder 15. To produce the inside thickening 13 the tube 10 is axially compressed while heated.

In Fig. 6 the tube 10 is held stationary during this tapering, and the end face of the taper-side presses against the shoulder 15. The tools 17 for the tapering operation execute a rotary movement about the tube axis, to form one or more internal thickenings 13 the tube is axially compressed while heated.

In Fig. 7, the tube 10 is subjected to shoulder pressure on its end face, and is stationary during tapering, the tools 17 executing a rotary movement; to thicken the tube, it is heated in the region to be thickened and the shoulder 15 and the tools 17 are axially displaced.

Fig. 8 shows an axially rotating tube 10, supported during the tapering operation at the end faces against shoulders 15, the tube being heated in the region to be thickened.

In Fig. 9, which corresponds to Fig. 7, the tube 10 is retained under shoulder pressure at the end face and is stationary during tapering; the tools 17 are axially moved and rotated and while heat is supplied, execute a thrust movement on the tube together with the shoulders 15.

These various movements of the tube 10 and the tools 17 are illustrated by the arrows.

To make the tapered ends or a part of the tapered tube ends at a required angle (e.g., between 1° and 2°) relative to the longitudinal axis of the tube, the tools 17 may be located at this angle to the said longitudinal axis.

The described method of processing for producing a shaft with tapered ends one or more internal thickenings may be carried out in a simple and reliable manner on both ends of the tube.

An axle tapered and internally thickened in accordance with the invention may have a variety of cross-sections and may be formed, from a tube of cylindrical, flattened or oval cross-section.

We claim:

1. In a method for manufacturing a shaft, the steps of introducing into at least one end region of a hollow metal tube having predetermined inner and outer diameters a mandrel having a diameter smaller than said predetermined inner diameter, radially compressing said end region for reducing the outer diameter of the tube at the end region thereof which surrounds said mandrel, while the latter remains in said end region so as to determine the extent to which the predetermined inner diameter of the tube is reduced simultaneously with the reduction in the outer diameter thereof at said end region, maintaining said tube under axial compression simultaneously with the radial compression thereof at said end region, with a force of axial compression at least great enough to prevent the length of the tube from increasing during reduction in the outer diameter of the tube, and heating the tube at said end region thereof simultaneously with the reduction in the outer and inner diameters thereof at said end region and simultaneously with the axial compression of the tube, so that in one operation said end region of said tube has its inner and outer diameters reduced while the thickness of the tube has a maximum value at a transition region between said end region of said tube and an immediately adjoining region of the tube where said predetermined inner and outer diameters remain unchanged.

2. In a method as recited in claim 1 and wherein all of said operations are simultaneously performed at both end regions of said tube.

3. In a method as recited in claim 1 and wherein forging tools are applied to the exterior of said tube at said end region thereof for reducing the outer diameter of the tube at said end region thereof.

4. In a method as recited in claim 3 and wherein a burner applies a flame to an exterior surface of said tube at said end region thereof accessible between the forging tools for heating the end region of the tube simultaneously with the reduction in the outer and inner diameters thereof and simultaneously with the application of axial compression to the tube.

5. In a method as recited in claim 4 and wherein said tube is rotated with respect to the forging tools and burner for distributing the radial compressive forces of the forging tools and the heat of the burner circumferentially about the axis of the tube at said end region thereof.

6. In a method as recited in claim 4 and wherein said forging tools and burner are rotated about the axis of the tube while the latter is maintained stationary for distributing the radial compressive forces of the forging tools and the heat of the burner circumferentially about the axis of the tube at said end region thereof.

7. In a method as recited in claim 4 and wherein said axial compressive force applied to said tube is sufficiently great to reduce the length of the tube and said forging tools and burner being axially displaced from said one end region toward an opposed end region of said tube for continuing the reduction in the inner and outer diameters of the tube and the heating of the tube at said end region thereof simultaneously with the reduction in the length of the tube by said axial compressive forces.

8. In a method as recited in claim 7 and wherein the forging tools also provide an axial thrust on said tube which augments the axial compressive forces.

9. In a method as recited in claim 1 and wherein the axial compression applied to the tube is sufficiently great to reduce the length thereof.

* * * * *